UNITED STATES PATENT OFFICE.

JOHN W. DIXON, OF PHILADELPHIA, PENNSYLVANIA.

IMPROVEMENT IN THE MANUFACTURE OF PAPER-PULP.

Specification forming part of Letters Patent No. 51,570, dated December 19, 1865.

*To all whom it may concern:*

Be it known that I, JOHN W. DIXON, of the city of Philadelphia and State of Pennsylvania, have invented a new and useful improvement in the process of making paper-pulp from wood, straw, cornstalks and other vegetable fibrous substance; and I do hereby declare the following to be a full and exact description of the same.

I cut the wood, straw, cornstalks, &c., into short lengths by any convenient cutting-machine. The cuttings are then placed in a strong closed boiler or digester and submitted to the action of a highly-heated solution of chloride of lime under pressure. (By the words "under-pressure" is meant a pressure at near or above 300° of Fahrenheit scale, which is as low as is advisable to work the process.) With wood I find a solution of 2° to 5° Baumé, at a pressure of 125 pounds, and the corresponding temperature, thereto will complete the pulping operation. A less strength of solution at this temperature—say from 1° to 3° of Baumé—will answer with straw, cornstalks, or sorghum, and I indicate these temperatures and strengths respectively in a good digesting apparatus such as is hereinafter described. I prefer, also, to perform the digesting operation under pressure in the peculiar apparatus for which I have applied for a patent in which the boiling liquid under pressure containing the chloride of lime or chlorine is made to circulate from the bottom to the top of the digester and through the mass to be pulped within the digester by means of a pump.

The heat may be communicated by a coil of steam or hot-water pipes in the bottom of the digester, or any other convenient mode.

I do not desire to limit myself to the above degrees of temperature for treating the material, nor the above strength of solution, nor to any special form of pulp-digesting apparatus. The heat of the liquid solution in the digester may be varied from 300° to 400° Fahrenheit, according to the nature of the substance to be treated, the length of time under treatment, and the form of digesting apparatus adopted.

The chloride of lime may be mixed or treated with dilute sulphuric acid, to throw down the lime and give a solution of chlorine in highly-heated water under pressure, instead of chloride of lime; or a solution of chlorine in water may be obtained by forcing the gas into water.

Having thus described my invention, what I claim as new, and desire to secure by Letters Patent, is—

The process of treating wood or other vegetable substances by boiling in a solution of chloride of lime, or chlorine in highly heated water, under-pressure, as a process or preparatory process for making pulp in the manufacture of paper from wood, straw, or other vegetable fibrous substance, substantially as described.

JOHN W. DIXON.

Witnesses:
GEO. BUCKLEY,
JOHN WHITE.